(12) United States Patent
Malaby et al.

(10) Patent No.: US 8,972,600 B2
(45) Date of Patent: Mar. 3, 2015

(54) METHOD AND APPARATUS FOR A FAULT RESILIENT COLLABORATIVE MEDIA SERVING ARRAY

(75) Inventors: Stephen Malaby, Devon, PA (US); James Barkley, Exton, PA (US)

(73) Assignee: Concurrent Computer Corporation, Duluth, GA (US)

( * ) Notice: Subject to any disclaimer, the term of this patent is extended or adjusted under 35 U.S.C. 154(b) by 1172 days.

(21) Appl. No.: 12/469,294

(22) Filed: May 20, 2009

(65) Prior Publication Data

US 2009/0225649 A1 Sep. 10, 2009

Related U.S. Application Data

(62) Division of application No. 11/546,795, filed on Oct. 12, 2006, now abandoned.

(51) Int. Cl.
| | | |
|---|---|---|
| H04L 29/08 | (2006.01) | |
| H04L 29/06 | (2006.01) | |
| H04N 21/218 | (2011.01) | |
| G06F 9/50 | (2006.01) | |
| H04N 7/173 | (2011.01) | |
| G06F 12/00 | (2006.01) | |

(52) U.S. Cl.
CPC ........ H04L 67/1097 (2013.01); *H04N 21/2182* (2013.01); *G06F 9/505* (2013.01); H04L 29/08954 (2013.01); H04L 29/06 (2013.01); *H04N 7/17318* (2013.01); *G06F 12/00* (2013.01)
USPC ............ 709/235; 709/217; 709/231; 711/108

(58) Field of Classification Search
CPC .......................... G06F 12/00; H04L 67/1097
USPC .................. 709/608, 235, 231, 217; 711/108
See application file for complete search history.

(56) References Cited

U.S. PATENT DOCUMENTS

| | | | |
|---|---|---|---|
| 4,583,088 A | 4/1986 | Bux et al. | |
| 5,794,242 A * | 8/1998 | Green et al. | ......................... 1/1 |
| 6,088,330 A | 7/2000 | Bruck et al. | |
| 6,115,740 A | 9/2000 | Mizutani | |
| 6,289,165 B1 | 9/2001 | Abecassis | |
| 6,334,141 B1 * | 12/2001 | Varma et al. | .................. 709/205 |
| 6,397,251 B1 | 5/2002 | Graf | |
| 6,408,128 B1 | 6/2002 | Abecassis | |
| 6,785,668 B1 | 8/2004 | Polo et al. | |
| 6,813,777 B1 | 11/2004 | Weinberger et al. | |
| 6,917,984 B1 | 7/2005 | Tan | |
| 6,956,832 B1 * | 10/2005 | Muhonen et al. | ............. 370/310 |
| 6,965,926 B1 | 11/2005 | Shapiro et al. | |

(Continued)

OTHER PUBLICATIONS

U.S. Appl. No. 11/546,795, "Non-Final Office Action", Apr. 1, 2009.

(Continued)

*Primary Examiner* — Ondrej Vostal
(74) *Attorney, Agent, or Firm* — Philip H. Burrus, IV

(57) ABSTRACT

Embodiments of the present invention provide methods, systems, and apparatuses for a fault resilient collaborative media serving array comprising a plurality of nodes. In one embodiment, the present invention provides a method for creating a fault resilient collaborative media serving array where the array nodes do not share memory, the serving of a content file is accomplished by the collaborative efforts of many nodes in the array, and where there is no fixed allocation of sessions to nodes.

17 Claims, 10 Drawing Sheets

(56) References Cited

U.S. PATENT DOCUMENTS

| | | | |
|---|---|---|---|
| 7,047,297 B2* | 5/2006 | Huntington et al. | 709/224 |
| 7,061,482 B2 | 6/2006 | Ferris | |
| 7,099,951 B2 | 8/2006 | Laksono | |
| 7,149,189 B2* | 12/2006 | Huntington et al. | 370/235 |
| 7,149,359 B1 | 12/2006 | Omoigui | |
| 7,181,523 B2 | 2/2007 | Sim | |
| 7,320,131 B1 | 1/2008 | O'Toole | |
| 7,330,717 B2 | 2/2008 | Gidron et al. | |
| 7,412,533 B1* | 8/2008 | Johnson et al. | 709/231 |
| 7,500,010 B2* | 3/2009 | Harrang et al. | 709/233 |
| 7,523,507 B2* | 4/2009 | Leinonen et al. | 726/32 |
| 7,526,564 B2* | 4/2009 | Guo et al. | 709/231 |
| 7,543,076 B2* | 6/2009 | Mehr et al. | 709/238 |
| 7,546,319 B1 | 6/2009 | Srinivasan et al. | |
| 7,617,515 B1 | 11/2009 | Laksono | |
| 7,631,045 B2 | 12/2009 | Boerries et al. | |
| 7,631,330 B1 | 12/2009 | Des Jardins | |
| 7,689,764 B1* | 3/2010 | De Spiegeleer et al. | 711/108 |
| 7,760,956 B2* | 7/2010 | Lin et al. | 382/254 |
| 7,953,723 B1 | 5/2011 | Dutton et al. | |
| 8,015,584 B2 | 9/2011 | Breen et al. | |
| 8,230,098 B2 | 7/2012 | Chen et al. | |
| 2001/0041053 A1 | 11/2001 | Abecassis | |
| 2001/0041062 A1 | 11/2001 | Ottesen et al. | |
| 2002/0133491 A1 | 9/2002 | Sim et al. | |
| 2002/0156911 A1* | 10/2002 | Croman et al. | 709/235 |
| 2002/0156912 A1 | 10/2002 | Hurst et al. | |
| 2002/0159519 A1 | 10/2002 | Tabatabai et al. | |
| 2002/0184642 A1* | 12/2002 | Lude et al. | 725/105 |
| 2003/0037261 A1 | 2/2003 | Meffert et al. | |
| 2003/0070169 A1 | 4/2003 | Beyers et al. | |
| 2003/0084180 A1* | 5/2003 | Azami | 709/231 |
| 2003/0110263 A1* | 6/2003 | Shillo | 709/226 |
| 2003/0115369 A1* | 6/2003 | Walter et al. | 709/253 |
| 2003/0161302 A1 | 8/2003 | Zimmermann et al. | |
| 2003/0204602 A1 | 10/2003 | Hudson et al. | |
| 2003/0204613 A1 | 10/2003 | Hudson et al. | |
| 2003/0217362 A1 | 11/2003 | Summers et al. | |
| 2003/0233455 A1 | 12/2003 | Leber et al. | |
| 2004/0004619 A1 | 1/2004 | Capin et al. | |
| 2004/0010592 A1 | 1/2004 | Carver et al. | |
| 2004/0039834 A1 | 2/2004 | Saunders et al. | |
| 2004/0073553 A1 | 4/2004 | Brown et al. | |
| 2004/0103150 A1* | 5/2004 | Ogdon et al. | 709/205 |
| 2004/0117427 A1 | 6/2004 | Allen et al. | |
| 2004/0255323 A1 | 12/2004 | Varadarajan et al. | |
| 2004/0261091 A1 | 12/2004 | Cherkasova | |
| 2005/0041679 A1 | 2/2005 | Weinstein et al. | |
| 2005/0111824 A1* | 5/2005 | Hunter et al. | 386/52 |
| 2005/0114538 A1 | 5/2005 | Rose | |
| 2005/0144304 A1* | 6/2005 | Hodges et al. | 709/231 |
| 2005/0283496 A1 | 12/2005 | Carpentier et al. | |
| 2006/0010203 A1* | 1/2006 | Mrsic-Flogel et al. | 709/205 |
| 2006/0015580 A1 | 1/2006 | Gabriel et al. | |
| 2006/0053209 A1 | 3/2006 | Li | |
| 2006/0064716 A1 | 3/2006 | Sull et al. | |
| 2006/0080167 A1* | 4/2006 | Chen et al. | 705/14 |
| 2006/0173985 A1 | 8/2006 | Moore | |
| 2006/0218609 A1 | 9/2006 | Johnson et al. | |
| 2006/0282677 A1 | 12/2006 | Rodriguez et al. | |
| 2006/0287956 A1 | 12/2006 | Higashi et al. | |
| 2006/0294145 A1 | 12/2006 | Saunders et al. | |
| 2007/0005801 A1 | 1/2007 | Kumar et al. | |
| 2007/0050406 A1* | 3/2007 | Byers | 707/104.1 |
| 2007/0204003 A1 | 8/2007 | Abramson | |
| 2007/0266169 A1 | 11/2007 | Chen et al. | |
| 2007/0288638 A1 | 12/2007 | Vuong et al. | |
| 2007/0294333 A1 | 12/2007 | Yang et al. | |
| 2008/0250130 A1 | 10/2008 | Li et al. | |
| 2008/0281917 A1* | 11/2008 | Wolf et al. | 709/205 |

OTHER PUBLICATIONS

Tusch, R. "Design and Implementation of an Adaptive Distributed Multimedia Streaming Server", PhD Thesis, University Klagenfurt, 2004.

Vostal, Ondrej "Non-Final Office Action", U.S. Appl. No. 11/546,795, filed Oct. 12, 2006, Stephen Malaby, inventor, Mailed Apr. 13, 2010.

Vostal, Ondrej C., "Non-Final Office Action", U.S. Appl. No. 12/469,294, filed May 20, 2009, mailed Dec. 22, 2010.

Mulhem, et al., "From Database to Web Multimedia Documents", *Multimedia Tools and Applications*, 20, 263-282, Kluwer Academic Publishers, 2003.

Vostal, Ondrej C., "Final Office Action", U.S. Appl. No. 11/546,795, filed Oct. 12, 2006; mailed: Jan. 24, 2011; inventors: malaby et al.

WIPO, "PCT International Search Report", WO/2008/045542 A3, published Apr. 17, 2008, Filed Oct. 12, 2007.

WIPO, "International Preliminary Report on Patentability", PCT/US2007/021843, Filed Oct. 12, 2007.

WIPO, "Written Opinion", PCT/US07/21834, Filed Oct. 12, 2007.

Vostal, Ondrej "Final Office Action", U.S. Appl. No. 11/546,795, filed Oct. 12, 2006, Mailed Sep. 10, 2009.

Hunter, et al., "Building and Indexing a Distributed Multimedia Presentation Archive Using SMIL", *DSTC Pty Ltd.*, Level 7, GP South, University of Queensland, Australia, Unknown Publication Date.

Bugaj, et al., "Synchronized Multimedia Integration Language", *W3C Working Draft*, www.w3.org/TR/1998/WD-smil-0202, Feb. 1998.

Boll, et al., "A Cross-Media Adaptation Strategy for Multimedia Presentations", *Databases and Information Systems*, Computer Science Department, University of Ulm, Germany, 1999.

Duke, et al., "A Standard for Multimedia Hardware", *ACM Multimedia '98*, Bristol, UK, 1998.

Vostal, Ondrej C., "NonFinal Office Action", U.S. Appl. No. 11/546,795, filed Oct. 12, 2006; Mailed Sep. 27, 2011.

"Publication", Vuong, "Peer to Peer Infrastructure and System for Large-Scale Content Search and Cost-Effective On-Demand Media Streaming", Apr. 2006.

Vostal, Ondrej C., "Final Office Action", U.S. Appl. No. 11/546,795, filed Oct. 12, 2006; Mailed Jun. 5, 2012.

Vostal, Ondrej C., "NonFinal OA", U.S. Appl. No. 11/546,795, filed Oct. 12, 2006; Mailed Jun. 4, 2013.

Vostal, Ondrej "NonFinal OA", U.S. Appl. No. 11/546,795, filed Oct. 12, 2006; Mailed May 22, 2014.

Bryson, "*Phillips v. AWH Corp.*", 2005.

Merriam-Webster Corp., "request", Merriam-Webster online dictionary, 2014.

Vostal, Ondrej "Notice of Allowance", U.S. Appl. No. 11/546,795, filed Oct. 12, 2006; Mailed Oct. 10, 2014.

Vostal, Ondrej "NonFinal OA", U.S. Appl. No. 11/546,795, filed Oct. 12, 2006; Mailed Nov. 13, 2013.

* cited by examiner

METHOD AND APPARATUS FOR A FAULT RESILIENT COLLABORATIVE MEDIA SERVING ARRAY

CROSS REFERENCE TO RELATED APPLICATIONS

This application is a divisional application from, and claims priority under 35 USC §121 to, U.S. Ser. No. 11/546,795, filed Oct. 12, 2006, entitled "Method and Apparatus for a Fault Resilient Collaborative Media Serving Array."

BACKGROUND OF THE INVENTION

Digital television networks enable two-way communication so that a subscriber can interact or "request" information from the network equipment. Typically, a menu—also called an interactive program guide (IPG) or electronic program guide (EPG), is employed to list the content available for viewing. The IPG application enables a viewer to browse listings of available programming and associated information and to select content for viewing. The subscriber can utilize the menu to request additional information regarding the offerings.

Typically, the menu has a numeric listing by channel of broadcast television programming. Additionally, a subscriber may have access to narrowcast applications. Narrowcast programming is point-to-point streaming of video from a storage point in the network to a specific subscriber. Narrowcast applications are made possible by compression techniques such as the standards developed by the Moving Picture Experts Group (MPEG), which enables more content to be delivered to viewers with little or no degradation in picture quality. The resulting increase in transmission capacity allows narrowcast programming to be placed alongside broadcast programming for delivery to viewers.

A dominant narrowcast application is the delivery of content on demand (COD). This content may span many categories, including movies on demand (MOD), video on demand (VOD), subscription video on demand (SVOD), free on demand (FOD), and network-based digital video recording (NDVR). The ability to deliver narrowcast content to viewers creates the opportunity to provide a targeted viewing experience that allows advertisement and promotional content to be selected for and delivered to each viewer.

In a narrowcast serving environment, it is desirable that large communities of set-top boxes can access the same library of content. Typically, arrays of servers are formed to address a given set of set-top boxes and any set-top that has access to the array has access to the same set of media titles. If COD is available, the subscriber can order the content and watch it on his/her television or monitor. Otherwise, the subscriber would need to rent, purchase, or view the movie from another source.

When a customer, via his set-top box, orders a particular media title, a session is said to have been created. That session may be composed of several smaller "title sessions"—title sessions are discrete packages of content or data that collectively makeup the content requested for the overall session— e.g. one title session for the advertisement prior to the main program and another for the main program. Each title session is served by a single node on the array and all the data associated with the particular title is served through that node to a particular set-top box.

Historically, there have been several limitations to media arrays. First, the assignment of the serving of the title session to a particular node on the array makes that node a single point of failure with respect to the title session. For example, if a viewer was watching the Super Bowl on a stream being served from a node in the array and that node has a failure, then the viewer's stream would be lost and his session would be interrupted.

While the array implementations presently known in the art have collaboration between content storage devices for the purposes of reading data (e.g. RAID55, IO Shipping, and network RAID), these architectures still require that all the data pass through the assigned serving node. Thus, the serving nodes do not collaborate on the output of a single file or title session to a given client session. The serving node is therefore a single point of failure with regard to a particular client session despite the resilience of the content storage devices accessible by the serving node.

Thus, there is a need in the art for methods, systems, and apparatuses for sending content that provides for the seamless delivery of content to a user when a serving node fails. Similarly, there is a need in the art for methods, systems, and apparatuses for allocating partitioned content among two or more nodes to provide a fault resilient content delivery system.

SUMMARY OF THE INVENTION

The present invention provides methods, systems, and apparatuses (hereinafter "method" or "methods" for convenience) for delivering content to a user. One embodiment of the present invention provides a system for delivering content comprising a plurality of nodes comprising at least a first node and a second node; a content file that has been partitioned into an ordered list of parts comprising at least a first part and a second part; and a client device for receiving the parts over the network, wherein the first node and the second node are synchronized to send the first part and the second part to the client device in-order over a network.

Another embodiment of the present invention provides a node for delivering content to a user, wherein the content is partitioned into an ordered list of parts with one or more parts allocated to each of a plurality of nodes so that the user can play the parts in the order that they are received, with the node comprising a stream pump for sending one or more parts in-order to the user over a downstream network; a processor for determining when the node should send the one or more parts over the network; a first communications interface for connecting the to the network; and a data retriever for receiving the one or more parts allocated to the node.

Yet another embodiment of the present invention provides a method for delivering content over a network, the method comprising the steps of partitioning the content into an ordered list of parts; allocating the parts among a plurality of nodes; synchronizing the plurality of nodes so that the parts can be sent in-order form the plurality of nodes to a user; and delivering the content to the user by sending the parts in-order from the plurality of nodes over the network to the user.

A further embodiment of the present invention provides a method for sending content to a user, the method comprising the steps of partitioning the content into an ordered list of parts comprising a first part and a second part; allocating the first part to the first node; allocating the second part to the second node; sending the first part from the first node to the user; determining which of a plurality of nodes is the second node; indicating to the second node that it should send the second part to the user; and sending the second part from the second node to the user.

Another embodiment of the present invention provides a method for recovering from fault in a content serving array comprising at least a first node, a second node, and the third node, the method comprising the steps of partitioning the content into an ordered list of parts comprising at least a first part and a second part; allocating the first part to the first node; allocating the second part to the second node; indicating to the first node that it should send the first part to a client device; failing to receive by the second node an indication that the first node has sent the first part to the client device; indicating to the third node that it should send the first part to the client device; sending by the third node the first part to the client device; and sending by the second node the second part to the client device.

It will be apparent to those skilled in the art that various devices may be used to carry out the methods, systems, and apparatuses of the present invention, including cell phones, personal digital assistants, wireless communication devices, personal computers, set-top boxes, or dedicated hardware devices designed specifically to carry out embodiments of the present invention. While embodiments of the present invention may be described and claimed in a particular statutory class, such as the system statutory class, this is for convenience only and one of skill in the art will understand that each embodiment of the present invention can be described and claimed in any statutory class, including systems, apparatuses, methods, and computer program products.

Unless otherwise expressly stated, it is in no way intended that any method or embodiment set forth herein be construed as requiring that its steps be performed in a specific order. Accordingly, where a method, system, or apparatus claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The foregoing and other advantages and features of the invention will become more apparent from the detailed description of exemplary embodiments of the invention given below with reference to the accompanying drawings.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DETAILED DESCRIPTION OF THE INVENTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Figure 1A:
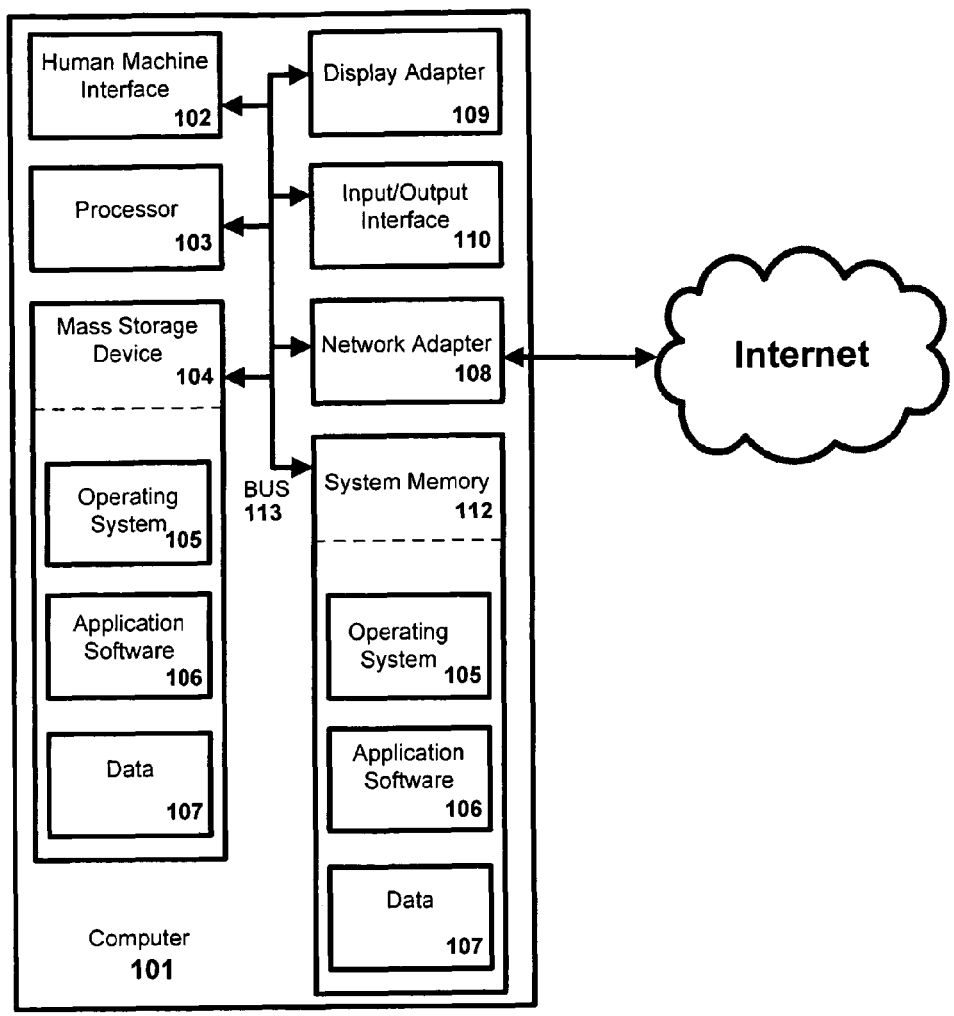
FIG. 1A illustrates one embodiment of a system in which various embodiments of the present invention may be implemented.

The methods of the present invention can be carried out using a processor programmed to carry out the various embodiments of the present invention. FIG. 1A is a block diagram illustrating a computing device for performing the various embodiments. This exemplary computing device is only an example of an operating environment and is not intended to suggest any limitation as to the scope of use or functionality of operating environment architecture. Neither should the operating environment be interpreted as having any dependency or requirement relating to any one or combination of components illustrated in the disclosed computing device.

The methods can be operational with numerous general purpose or special purpose computing system environments or configurations. Examples of well known computing systems, environments, and/or configurations that may be suitable for use with the method include, but are not limited to, personal computers, server computers, laptop devices, set-top boxes, and multiprocessor systems. Additional examples include set top boxes, programmable consumer electronics, network PCs, minicomputers, mainframe computers, distributed computing environments that include any of the above systems or devices, and the like.

The methods may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

The methods disclosed herein can be implemented via a general-purpose computing device in the form of a computer 101. The components of the computer 101 can include, but are not limited to, one or more processors or processing units 103, a system memory 112, and a system bus 113 that couples various system components including the processor 103 to the system memory 112.

The processor 103 in FIG. 1A can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 113 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 113, and all buses specified in this description can also be implemented over a wired or wireless network connection and each of the subsystems, including the processor 103, a mass storage device 104, an operating system 105, application software 106, data 107, a network adapter 108, system memory 112, an Input/Output Interface 110, a display adapter 109, a display device 111, and a human machine interface 102, can be contained within one or more remote computing devices at physically separate locations, connected through buses of this form, in effect implementing a fully distributed system.

The operating system 105 in FIG. 1A includes operating systems such as MICROSOFT WINDOWS XP, WINDOWS 2000, WINDOWS NT, or WINDOWS 98, and REDHAT LINUX, REDHAWK LINUX, FREE BSD, or SUN MICROSYSTEMS SOLARIS. Additionally, the application software 106 may include web browsing software, such as MICROSOFT INTERNET EXPLORER or MOZILLA FIREFOX, enabling a user to view HTML, SGML, XML, or any other suitably constructed document language on the display device 111.

The computer 101 typically includes a variety of computer readable media. Such media can be any available media that is accessible by the computer 101 and includes both volatile and non-volatile media, removable and non-removable media. The system memory 112 includes computer readable media in the form of volatile memory, such as random access memory (RAM), and/or non-volatile memory, such as read only memory (ROM). The system memory 112 typically contains data such as data 107 and and/or program modules such as operating system 105 and application software 106 that are immediately accessible to and/or are presently operated on by the processing unit 103.

The computer 101 may also include other removable/non-removable, volatile/non-volatile computer storage media. By way of example, FIG. 1A illustrates a mass storage device 104 which can provide non-volatile storage of computer code, computer readable instructions, data structures, program modules, and other data for the computer 101. For example, a mass storage device 104 can be a hard disk, a removable magnetic disk, a removable optical disk, magnetic cassette, magnetic storage device, flash memory device, CD-ROM, digital versatile disk (DVD) or other optical storage, random access memories (RAM), read only memories (ROM), solid state storage units, electrically erasable programmable read-only memory (EEPROM), and the like.

Any number of program modules can be stored on the mass storage device 104, including by way of example, an operating system 105 and application software 106. Each of the operating system 105 and application software 106 (or some combination thereof) may include elements of the programming and the application software 106. Data 107 can also be stored on the mass storage device 104. Data 104 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 101 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 103 via a human machine interface 102 that is coupled to the system bus 113, but may be connected by other interface and bus structures, such as a parallel port, serial port, game port, or a universal serial bus (USB).

A display device 111 can also be connected to the system bus 113 via an interface, such as a display adapter 109. For example, a display device can be a cathode ray tube (CRT) monitor, a Liquid Crystal Display (LCD), or a television. In addition to the display device 111, other output peripheral devices can include components such as speakers (not shown) and a printer (not shown) which can be connected to the computer 101 via Input/Output Interface 110.

The computer 101 can operate in a networked environment using logical connections to one or more remote computing devices. By way of example, a remote computing device can be a personal computer, portable computer, a server, a router, a set top box, a network computer, a peer device or other common network node, and so on. Logical connections between the computer 101 and a remote computing device can be made via a local area network (LAN) and a general wide area network (WAN). Such network connections can be through a network adapter 108. A network adapter 108 can be implemented in both wired and wireless environments. Such networking environments are commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of application software 106 may be stored on or transmitted across some form of computer readable media. An implementation of the disclosed methods may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state devices, or any other medium which can be used to store the desired information and which can be accessed by a computer.

According to one embodiment of the present invention, a title session is broken down into an order list of parts, with one or more parts allocated to one or more nodes according to a predetermined plan. The determination of the plan may be made prior to or during the user's request for a given part of content, or while the user is receiving the content. A selection representing the content of potential interest to the user, such as a movie, is made by the user and the parts comprising the content are served to the user according to the predetermined plan by the nodes prescribed by the plan.

Figure 1B:
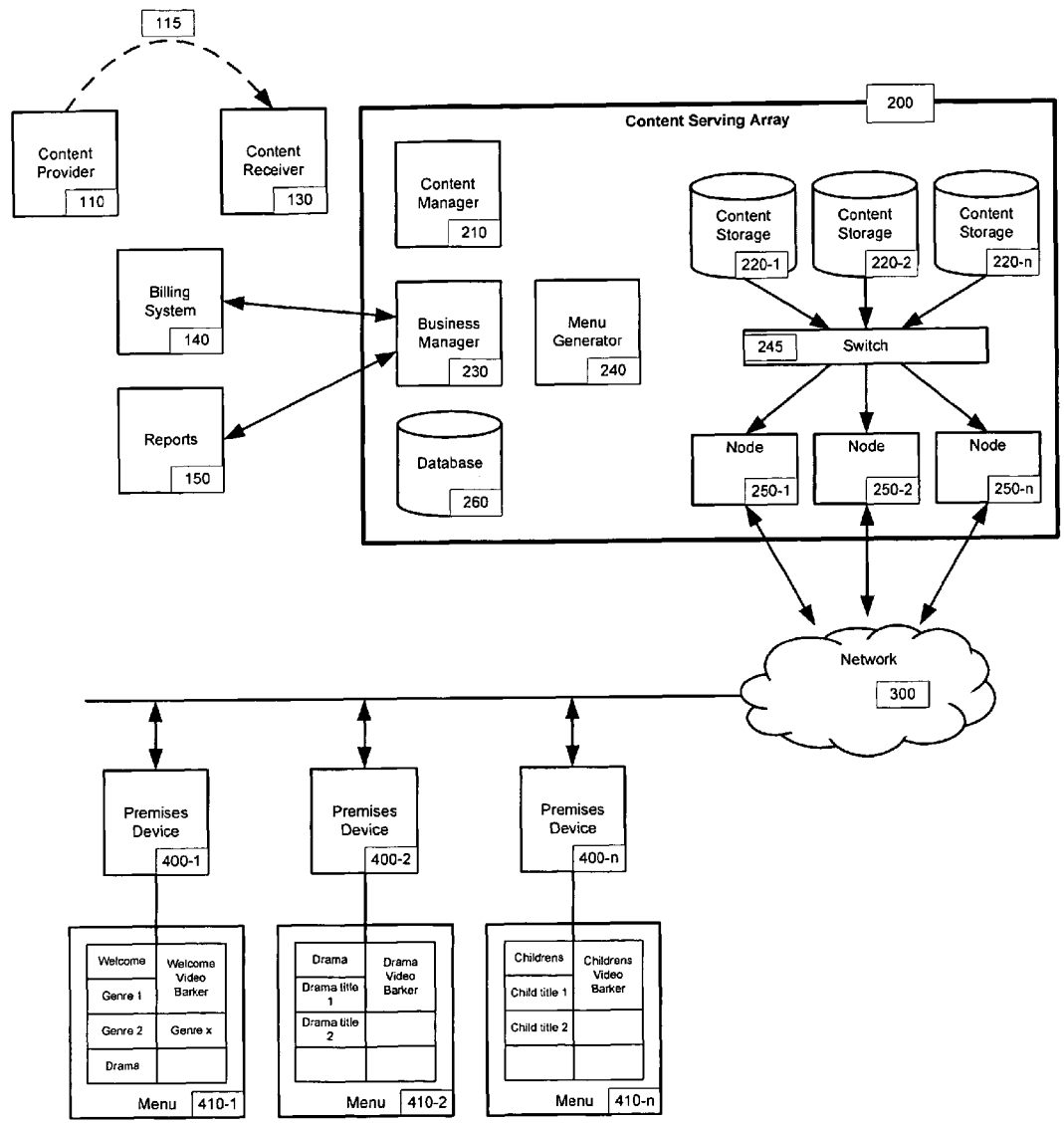
FIG. 1B shows a logical overview of a computer system which may be used to carry out various embodiments of the present invention.

FIG. 1B illustrates a content-on-demand (COD) content serving array 200 of one embodiment of the present invention. In the system shown in FIG. 1B, one or more content provider(s) 110 provide content to a COD content serving array 200 in various formats via various communication means 115. For example, the content serving array 200 may receive RF signals by satellite, ATM data from ATM networks, local feeds, and other information via terrestrial link. The content provider 110 may also provide the content by tape, DVD, or any other desired or suitable media.

The content is received by a content receiver 130 and forwarded to the content serving array 200 for storage in the content storage 220. Although depicted as being distinct from the content serving array 200, the content receiver 130 may be included in the content serving array in various embodiments of the present invention. In the content serving array 200, the content can be processed and reformatted as necessary in various embodiments of the present invention. For example, content can be received in digitally compressed format, de-multiplexed by a de-multiplexer, and stored in any convenient format or formats, such as MPEG-1 or MPEG-2. It will be appreciated, however, that the present invention is not limited to any particular content format.

Content is stored on the content storage devices 220-1 . . . 220-n of the current embodiment. Each of the content storage devices may include a tape drive, a JBOD (just a bunch of disks), a RAID (redundant array of inexpensive disks), a JBOD of solid state disks, a RAID of RAM disks, or any suitable type of storage device. The content may be stored in an encrypted format and then may be streamed in an encrypted format via a network 300 to premises devices 400-1, . . . , 400-n. Alternatively, the content may be encrypted as each session is streamed or may not be encrypted at all.

The data received by the content serving array 200 may include, in addition to the content itself, barkers and content descriptive data regarding the content received in various embodiments of the present invention. This content descriptive data may include, for example, information indicative of the content type, title, source, participants, summary, rating, time length, etc., herein referred to as "metadata."

In addition, the data received by the content serving array 200 may include trick files in various embodiments of the present invention. Trick files are precompiled files used in narrowcast systems to implement trick mode playback, such as fast-forward and rewind, in an efficient fashion. Rewinding or fast forwarding by playing the normal playback file at a higher rate of speed, in the manner done by cassette players and VCRs, is not an ideal or efficient choice when servicing multiple users, since it places significantly higher demands on the components in the system. In a COD system that services multiple users, trick files are used to achieve fast forwarding and rewinding. The trick files are composed of a subset, for example every other complete frames, of the normal content file. When the trick file is played at normal speed, it appears that the normal playback file is being played back at a faster speed.

The content serving array 200 may include a CPU or other processing device (not shown) and a relational database management system (RDBMS) 260 in some embodiments of the present invention. The RDBMS 260 functions as a server or storage device and has appropriate software and storage devices. The storage devices of the RDBMS 260 can contain a listing or table of one or more of the following: the content providers, the subscribers, the servers upon which the content is located, the orders, the purchase history of each subscriber, the content files, metadata related to the content files, and data regarding the usage (demand) of the content. The RDBMS 260 in one embodiment can be managed by a business manager 230 which additionally may interface with a billing system 140 to provide billing information to the billing system for the system operator. The business manager 230 may also provide reports regarding the operation of the server complex and/or coordinate with a reports server 150 for generating reports. In addition, the business manager 230 may maintain an authorization system (not shown) in various embodiments, wherein the business manager 230 contains information on the features, privileges, benefits, bonuses, space, tiers, etc., available to each customer and/or to each content provider. The authorization system may be external or may be included within another server, such as part of the RDBMS 260. Thus, when a customer requests content in one embodiment of the present invention, the system queries the business manager 230 to determine whether or not the customer is authorized to receive the content. If so, then the request may be approved. If not, then the request may be denied. Likewise, if a content provider 110 wishes to store a movie, that request may be granted, denied, or granted only with certain restrictions, such as to size or location. The RDBMS 260 may further capture every viewing event by each premises device identification, time, location, and other contextual data in various embodiments of the present invention.

According to one embodiment of the present invention, the customer requests a program via a premises device 400-1 . . . 400-n, such as, but not limited to, a set-top-box, personal computer, lap-top, personal digital assistant, cellular phone, or the computing device depicted in the embodiment of FIG. 1A. The request is sent over the network 300. The network 300 may be any type of network capable of transferring data electronically, such as, but not limited to, cable networks, the Internet, wireless networks, Telco networks, or satellite networks. For ease of explanation, this description shall use the terminology for a cable network, but one of skill in the art will understand that embodiments of the present invention can be implemented on any suitable type of wired or wireless network.

In the current embodiment of the present invention, a request for content or a menu sent by a user from a premises device 400-1, . . . 400-n is received by the server complex 200 and processed by the business manager 230. If authorized, the business manger 230 prompts the video stream engine 250-1, . . . , 250-n to send the requested content to the premises device 400-1, . . . , 400-n. The content is sent via network equipment that provides the managing, processing, and modulation, as appropriate, for the delivery of the video content across the network to the premises device 400-1, . . . , 400-n.

According to one embodiment, menus 410-1, . . . , 410-n may be narrowcast to the customer. Narrowcast or streaming of the menu to the customer, as well as combination of the narrowcast menu with a barker, may be performed as described in co-pending U.S. patent application Ser. No. 10/685,354. Using the combination technique described in the co-pending application, or any other suitable combination technique, any specific content may be narrowcast to the user as he/she is viewing the menu.

Figure 2A:
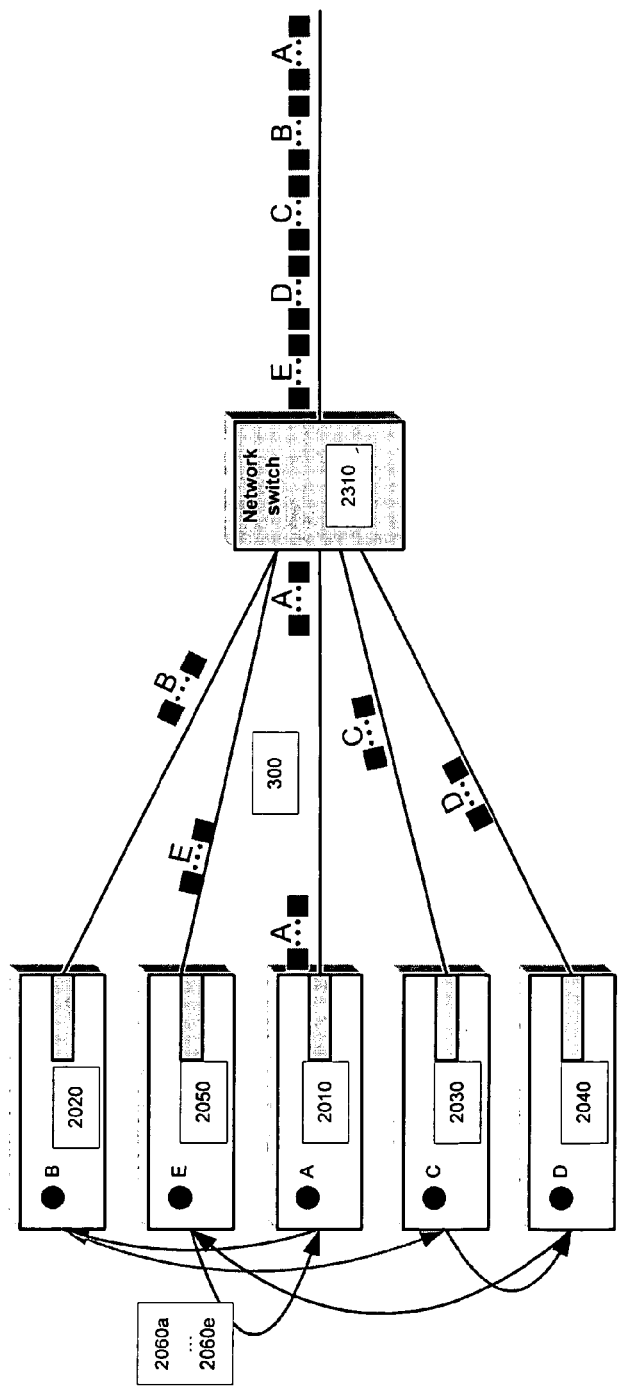
FIG. 2A illustrates a system for delivering content according to one embodiment of the present invention.

FIG. 2A illustrates one embodiment of the present invention that provides for the collaboration among a plurality of nodes to serve a content file that has been partitioned into an ordered list of parts. Node 2010 is the first node to serve a part of content. Servers 2020 through 2050 each then fire successively in the order B, C, D, and E. 2010's part is transmitted first over the network 300 through the switch 2310. Since nodes 2020 through 2050 each fire successively after 2010, their parts should each leave the switch 2310 in succession. Thus, a client receiving the content file will perceive the stream of parts as having come from a single source sending successive parts of the content file. In various embodiments of the present invention, the content file can comprise at least one of video data, audio data, multimedia data, MPEG data, MPEG-2 data, MPEG-4 data, one or more Groups of Pictures, binary data, or text data. For example, a content file may comprise a title session of MPEG-2 data.

One skilled in the art will appreciate the difficulty of maintaining successive chronological firing as between nodes 2010 through 2050 given that the bit rate for video streams is commonly in the range of 1 to 20 mega-bits per second. To accomplish this, FIG. 2A presents one embodiment using tokens 2060a through 2060e. Token 2060a is passed from node 2010 to node 2020 at a time proximate to when server 2010 is to fire. Similarly at a time proximate to when server 2020 is to fire it passes a token 2060b to server 2030, and so on.

Figure 2B:
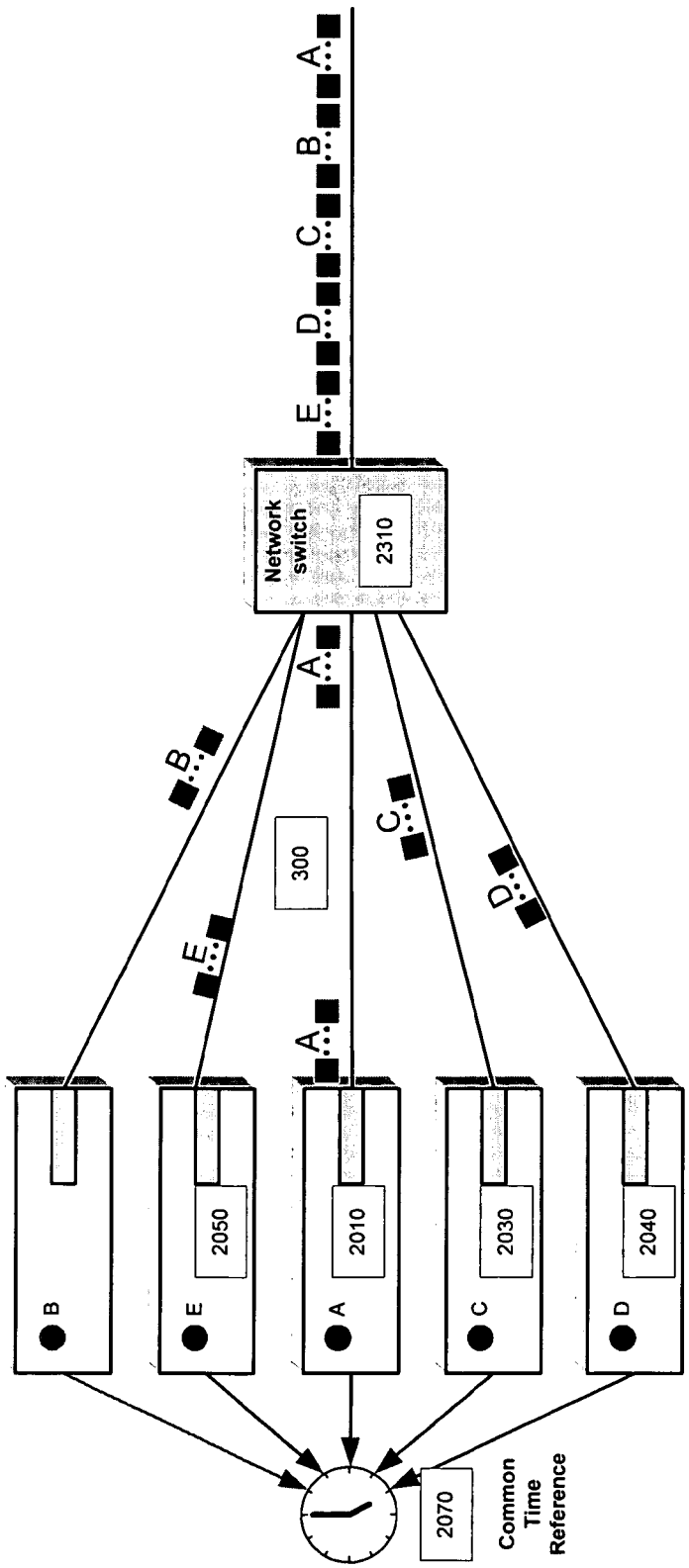
FIG. 2B illustrates another system for delivering content according to one embodiment of the present invention.

FIG. 2B provides one alternate embodiment for maintaining successive chronological firing as between 2010 through 2050. In the current embodiment, nodes 2010 through 2050 use a common time reference 2070 to maintain a synchronous time base. Each node refers to this common time reference to independently determine when to fire their respective part of the content file.

Figure 3:
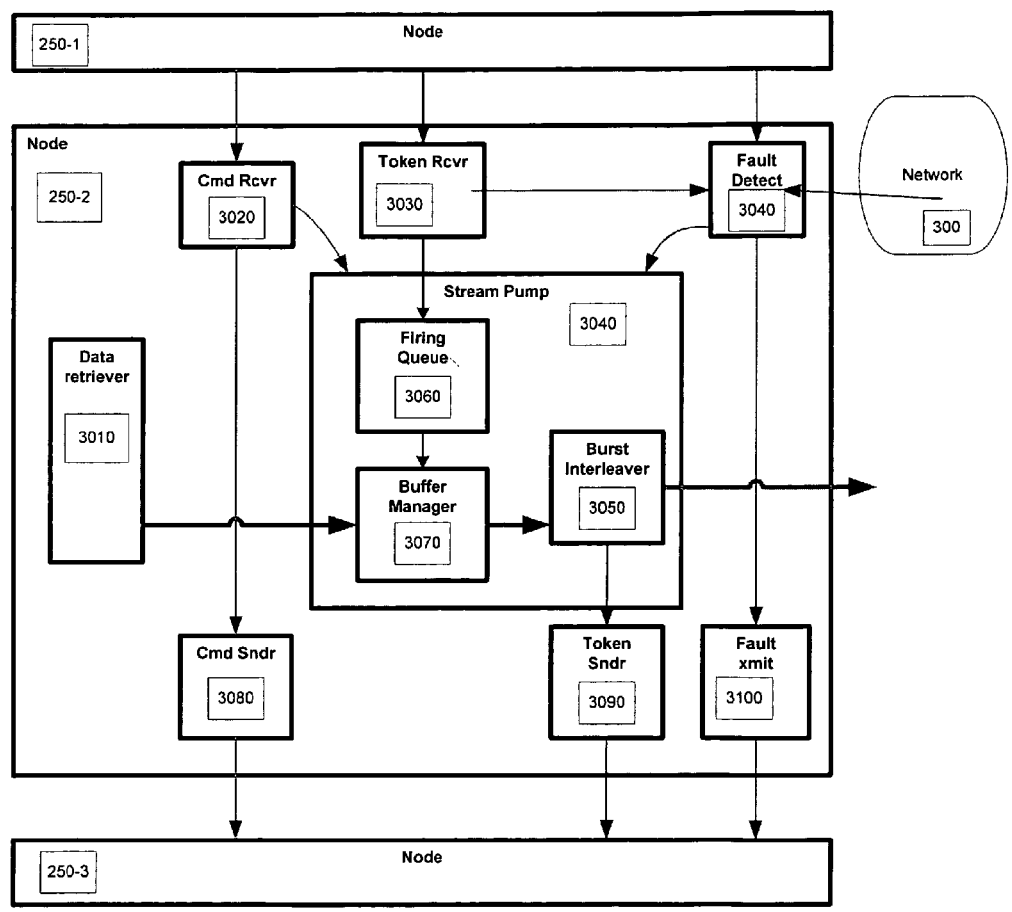
FIG. 3 illustrates the components of a node of one embodiment of the present invention.

FIG. 3 shows a node 250-1 of one embodiment of the present invention. The node 250-1 contains a low latency stream pump 3040 that "reads" parts of each content file for every stream and "fires" them out to the destination through the low latency network switch 2310 depicted in FIGS. 2A and 2B. The stream pump streams parts of content served by the content serving array 200. Those skilled in the art will understand that prior to embodiments of the present invention, a media server could only deliver a number of streams equivalent to the number of output ports multiplied by streams per output port. In embodiments of the present invention a single node, such as 250-A, does not just deliver a given number of streams, it can deliver a part of every stream in the content serving array of which it is a part. Besides handling firing order, the stream pump 3040 may also handle failover and interoperate with other components to maintain a coherent stream of parts as perceived by the consumers.

In the embodiment of FIG. 3, the Token Receiver 3030 and Sender 3090 are used to pass tokens representing the current node that must fire a part of content. A Firing Queue 3060 is shown that functionally decouples the reception of tokens from the stream pump 3040. The stream pump 3040 can pass a token on to the next node in the firing order through the Token Sender 3090 when it has delivered its current part. Actual token delivery may precede the delivery of the final part as is necessary to ensure that the client will receive an uninterrupted stream of parts as if the parts are coming from a single source. In some embodiments of the present invention the Token Receivers and Senders may be the only component directly aware of the firing order.

The Command Receiver 3020 and Sender 3080 of the current embodiment are used to quickly pass control commands received from a consumer (start, stop, pause, write, delete, etc. pertinent to the content being served in the title-session) to every node in the content serving array 200. The lead node passes on these commands using the Command Sender 3080. In one embodiment of the present invention, once a command has cycled through every node and returned to the lead node, the command is considered to be completed. Other means of passing and actually or probabilistically verifying receipt of commands can also be used by the present invention.

The Fault Detector 3040 of the current embodiment is responsible for identifying faults in the content serving array 200 or an output switch. It listens for notification of faults from sources including but not limited to: other nodes 250-n; a network switch 2310; or a Token timeout from the Token Receiver 3030. Once a fault is detected, it informs the stream pump 3040 and passes the fault on through the chain of nodes.

In one embodiment of the present invention a Data Retriever 3020 retrieves data for the stream pump 3040 to consume. Said data may be placed into a Buffer Manager 3070 and sent out at a time determined by the Burst Interleaver 3050 in the order prescribed by the Firing Queue 3060.

FIG. 2A shows one embodiment wherein each node delivers parts of content and passes on a token to the next node to continue the stream. FIG. 2B shows another embodiment wherein each node delivering parts of content uses a common time reference. The chaining of nodes described in the various embodiments is referred to as "firing order". In FIGS. 2A and 2B the firing order is A-B-C-D-E-A. However, not every stream is delivered with this single firing order pattern in embodiments of the present invention. For example, in one embodiment of the present invention having 5 nodes there are 5! (five factorial) firing order patterns. It is desirable in some embodiments that for each content file a firing order is chosen such that its order and timing do not duplicate that of a previously assigned firing order for an existing content file. Varying the firing order of the nodes is useful because, as documented below, when a node or link fails the other remaining nodes must pick up its responsibilities. By varying the firing order each remaining node picks up 1/(N−1) of the load, rather than just one of the nodes picking up the responsibility and doubling its work load.

Figure 4:
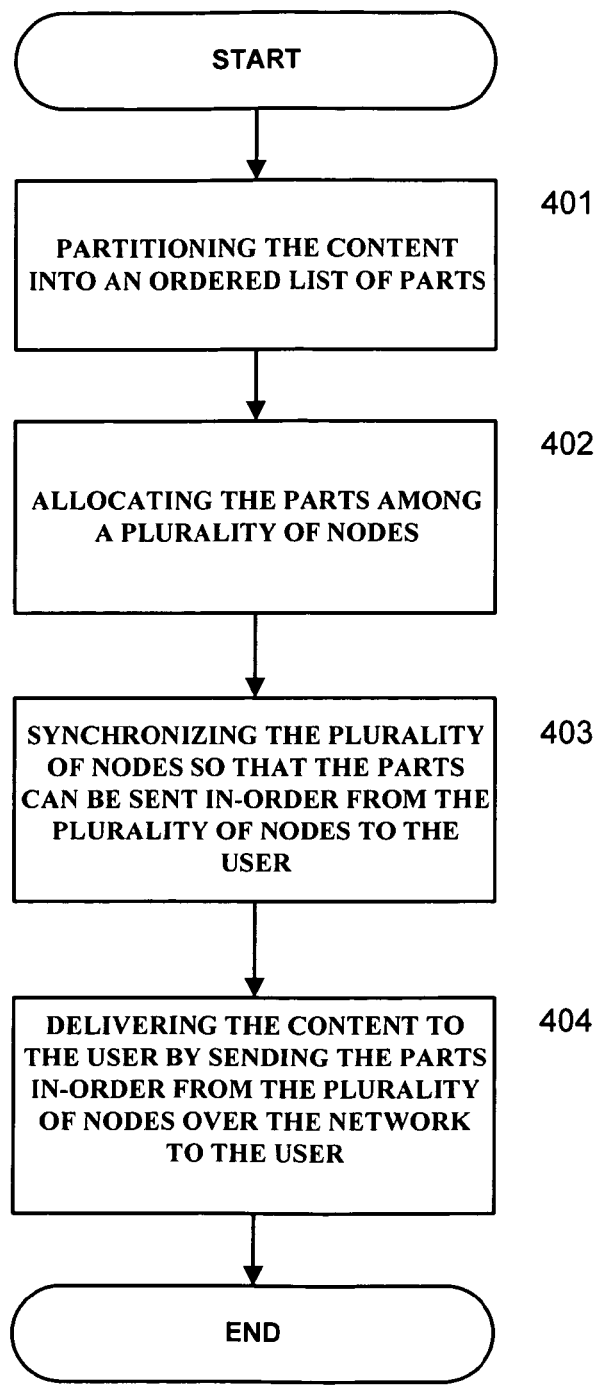
FIG. 4 illustrates one embodiment of the present invention for delivering content over a network.

FIG. 4 illustrates a method of one embodiment of the present invention useful for delivering content over a network. First, content is partitioned into an ordered list of parts 401. Second, the parts are allocated 402 among a plurality of nodes. In one embodiment based on the embodiment of FIG. 4, the nodes can be the nodes 250-1 to 250-n and the network can be the network 300, each as depicted in the embodiment of FIG. 1B. Third, the plurality of nodes are synchronized 403 so that the parts can be sent in-order from the plurality of nodes to the user. Finally, the parts are sent 404 in-order from the plurality of nodes to the user over the network.

In some embodiments of the present invention the parts can be allocated among the plurality of nodes before the parts are delivered to the user, such as in embodiments based on the embodiment of FIG. 4. In the alternative, the parts can be allocated dynamically among the plurality of nodes during delivery of content to the user. In some embodiments, the user is not aware that the content will be delivered from a plurality of nodes.

The plurality of nodes may have separate memory in various embodiments of the present invention, such as in embodiments based on the embodiment of FIG. 4. The memory of each node may comprise random access memory. Further, the user of any embodiment of the present invention may be participating in an on-demand session, the on-demand session being one of content-on-demand, movie-on-demand, video-on-demand, subscription video-on-demand, free-on-demand, or network-based digital video recording session. A content file can be a single content file, and the content file may comprise at least one of video content, audio content, multimedia content, trick content, binary content, or text content in embodiments of the present invention.

The parts can be allocated among the plurality of nodes according to a deterministic algorithm in various embodiments of the present invention, such as in embodiments extending the embodiment of FIG. 4. One of skill in the art will understand that numerous deterministic algorithms can be used with embodiments of the present invention, such as a round robin algorithm. A non-deterministic algorithm, such as a random or pseudo-random algorithm, can also be used to allocate parts among nodes in various embodiments of the present invention.

In a further embodiment of the present invention, such as in embodiments based on the embodiment of FIG. 4, the plurality of nodes may be synchronized so that the parts are sent in-order from the plurality of nodes to the user by passing a token among the plurality of nodes, with the token indicating when a receiving node should send its one or more parts to the user. In the alternative, the plurality of nodes can be synchronized using a common time reference.

Figure 5:
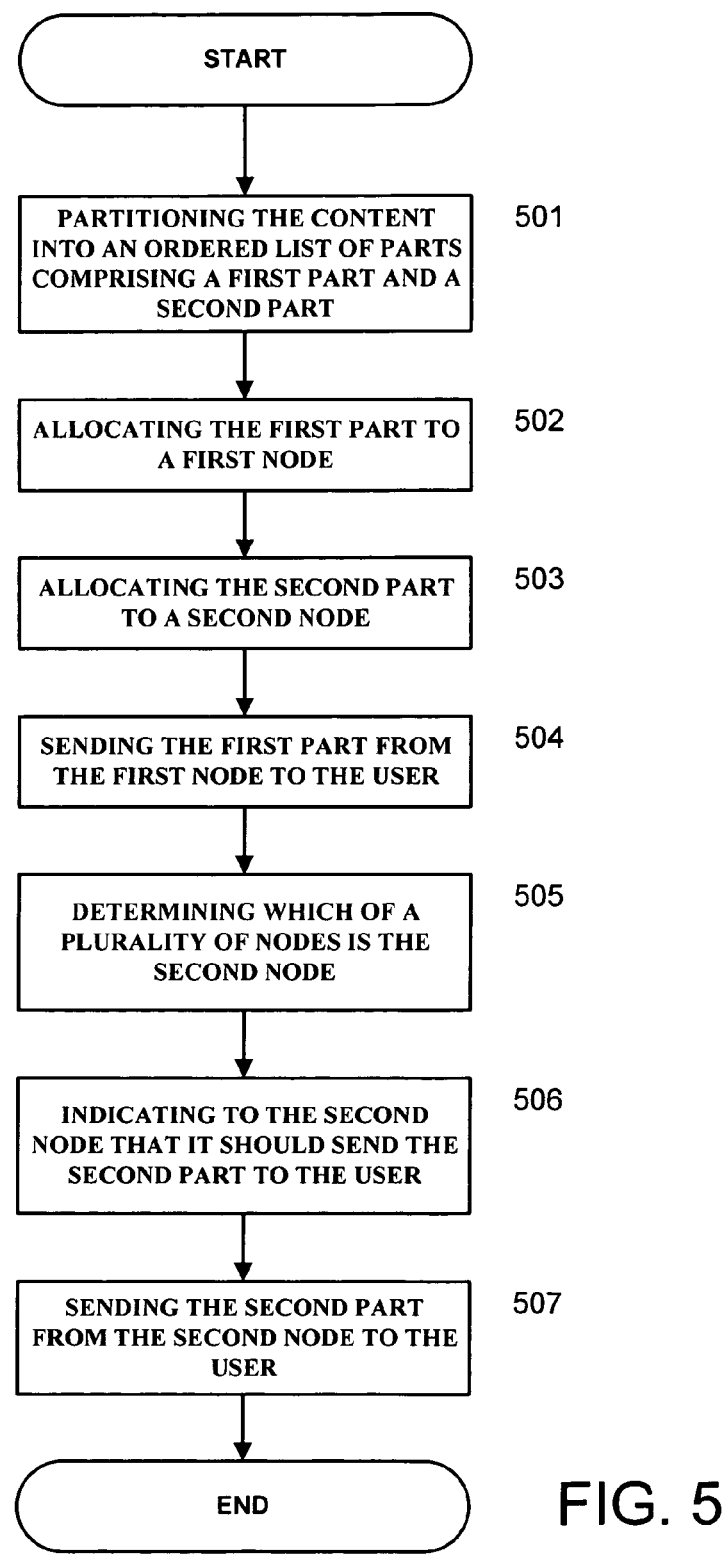
FIG. 5 illustrates one embodiment of the present invention for sending content to a user.

FIG. 5 illustrates the method of one embodiment of the present invention useful for sending content to a user. First in the embodiment of FIG. 5, the content is partitioned 501 into an ordered list of parts comprising a first part and a second part. The first part is allocated 502 to the first node and the second part is allocated 503 to the second node. Then, the first part is sent 504 form the first node to the user. Fifth, it is determined 505 which of the plurality of nodes is the second node, and it is then indicated 506 to the second node that it should send the second part to the user. Finally, the second part is sent 507 from the second node to the user.

In some embodiments of the present invention, such as in embodiments extending the embodiment of FIG. 5, a broker determines which of the plurality of nodes the second node is. Further, the broker can indicate to the second node that is should send the second part to the user by sending a token form the broker to the second node. In the alternative, a common time reference can be used to indicate to the second node that it should send the second part to the user. In further embodiments of the present invention, such as embodiments extending the embodiment of FIG. 5, the first node can determine independently which of the plurality of nodes the second node is, which can be accomplished, for example, using seed information such as the number of nodes which contain one or more parts of content, metadata describing the content, a common time reference, or a firing map that indicates the time order that each node should send its one or more parts in. Further, the first node can then indicate to the second node that it should send the second part by having a token sent to the second node, or a common time reference can be used to indicate to the second node that it should send the second part to the user.

Figure 6:
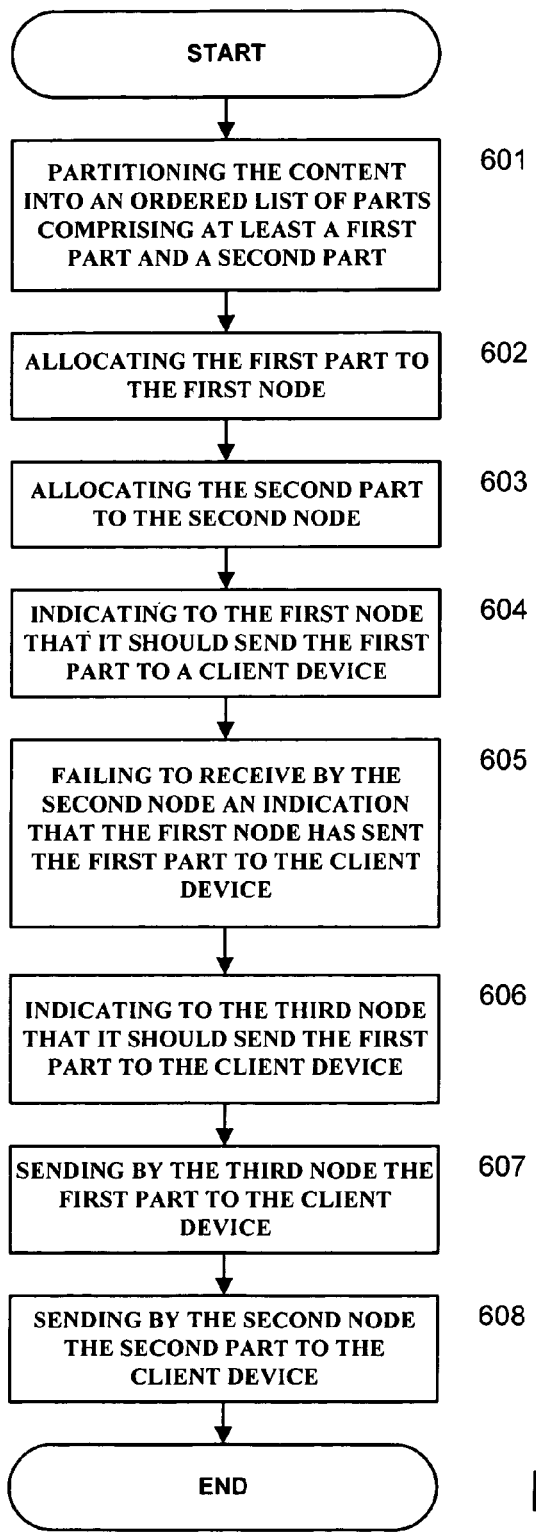
FIG. 6 illustrates one embodiment of the present invention for recovering from fault in a content serving array.

FIG. 6 illustrates one embodiment of the present invention for recovering from fault in a content serving array comprising at least a first node, a second node, and a third node. First in the embodiment of FIG. 6, the content is partitioned 601 into an ordered list of parts comprising at least a first part and a second part. Next, the first part is allocated 602 to the first node and the second part is allocated 603 to the second node. Fourth, it is indicated 604 to the first node that it should send the first part to a client device. Fifth, the second node fails 605 to receive an indication that the first node has sent the first part to the client device. It is then indicated 606 to the third node that it should send the first part to the client device. Finally, the third node sends 607 the first part to the client device and the second node sends 608 the second part to the client device.

In one embodiment of the present invention based on the embodiment of FIG. 6, the third node is the second node, and/or the first part may be reallocated to the third node. In various embodiments of the present invention, the client device buffers at least some of the received content. The client device can also present received parts in the order that they are received. In further embodiments based on the embodiment of FIG. 6, the parts can be allocated among the first, second, and third nodes using either a deterministic or non-deterministic algorithm.

Figure 7:
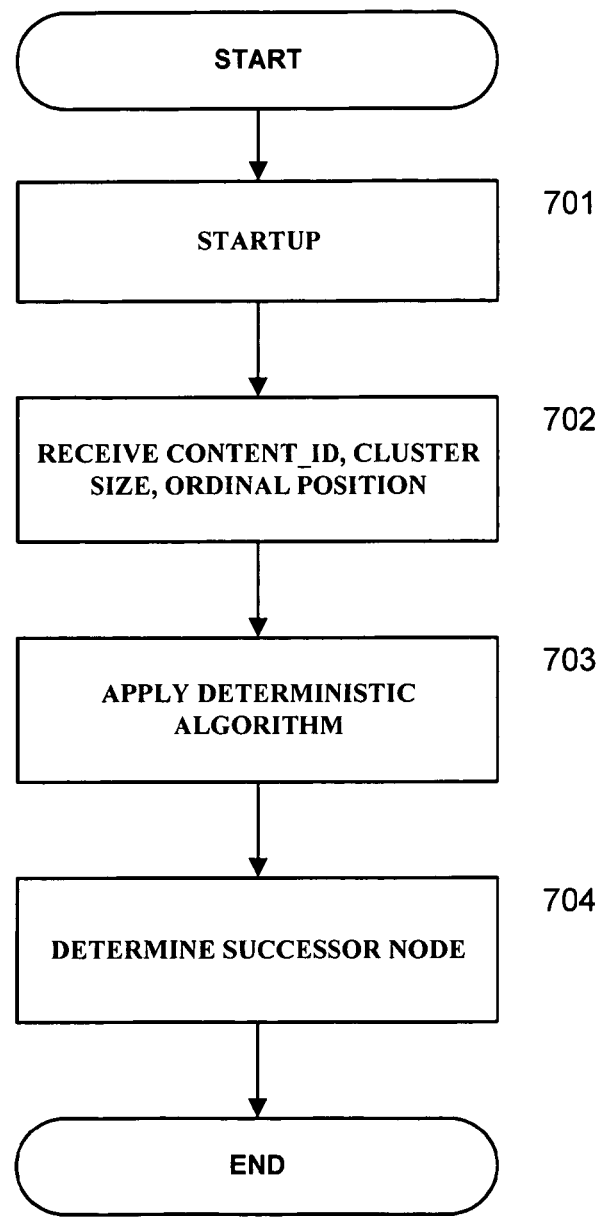
FIG. 7 illustrates one embodiment of the present invention for determining a firing order.

FIG. 7 illustrates one embodiment of the present invention for determining a firing order for a title session using a deterministic algorithm. First, after start-up of the title-session 701 a set of seed information such as, but not limited to, the content id of the content file, the content serving array size, and the lead nodes ordinal position, is received 702 by a node. An algorithm is then applied 703 which deterministically outputs 704 the successor of that node for that title-session. While other embodiments of the invention could alternatively use a centralized broker for determining firing order, the current embodiment shows how each node can independently determine the firing order, thereby lessening or removing the need for a centralized broker.

Figure 8:
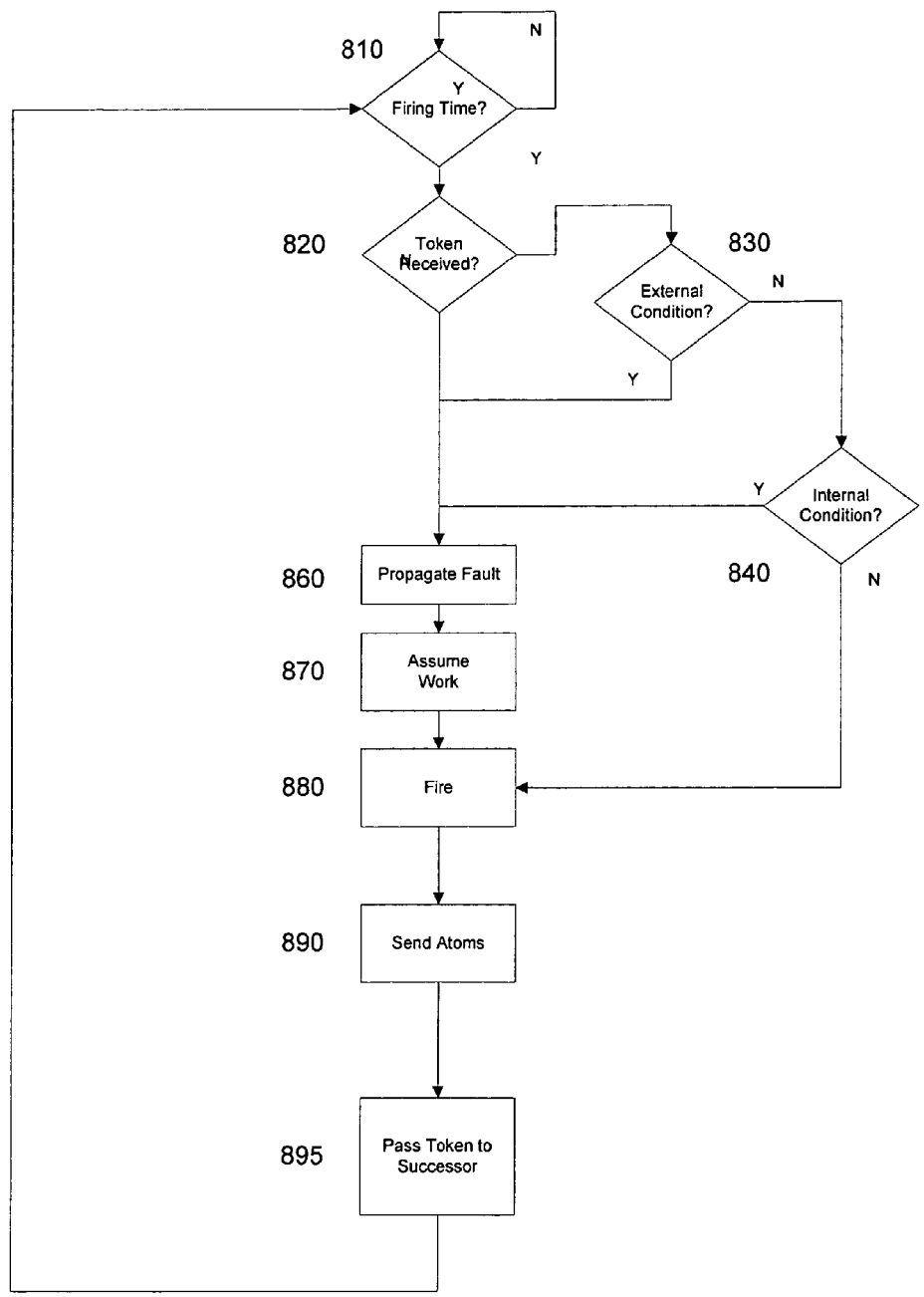
FIG. 8 illustrates one embodiment of the present invention for delivering information from a single node in the system.

FIG. 8 illustrates one embodiment of the present invention for delivering information from a single node in the system. First, at step 810 the server 250-$n$ will for each title-session determine at each cycle whether the time has arrived for delivery of a part of content for that title-session. If at step 820 the node has received a token from the previous node in the firing order and if at 830 no external component reports a condition that would prevent partition delivery, and additionally no internal condition is detected at step 840, then the process may advance to step 880 and fire the part designated at step 890 and pass 895 a token to the successor node in the firing order before starting the process again. If a fault has been detected in one of steps 820, 830, or 840 then the process must advance to step 860 and propagate the fault to the successor node and then it must assume the work 870, if possible, necessary to correct the fault by firing at step 880 the necessary part at 890 to fulfill both its own quota and that of any failed nodes in that cycle. The successor node to a failed node within a title-session firing order thereby takes over for the failed node's work until the failed node is restored to health.

While the present invention has been described in detail in connection with various embodiments, it should be understood that the present invention is not limited to the above-disclosed embodiments. Rather, the invention can be modified to incorporate any number of variations, alternations, substitutions, or equivalent arrangements not heretofore described, but which are commensurate with the spirit and scope of the invention.

What is claimed is:

1. A method for recovering from fault in a content serving array comprising at least a first node, a second node, and a third node, the method comprising:
    partitioning content into an ordered list of parts comprising at least a first part and a second part;
    allocating the first part to the first node;
    allocating the second part to the second node;
    sending the content successively and chronologically in-order as an ordered stream of parts corresponding to the ordered list by:
        indicating to the first node that it should send the first part to a client device;
        failing to receive by the second node an indication that the first node has sent the first part to the client device;
        indicating to the third node that it should send the first part to the client device;
        sending by the third node the first part to the client device; and
        sending by the second node the second part to the client device.

2. The method of claim 1, wherein the indicating to the first node comprises indicating to the first node that it should send the first part to the user by sending a token to the first node.

3. The method of claim 1, wherein the indicating to the first node comprises indicating to the first node that it should send the first part to the user by using a common time reference.

4. The method of claim 1, wherein the failing comprises failing to receive at the second node, within a predetermined time, a token indicating that the first node has sent the first part to the client device.

5. The method of claim 1, wherein the indicating to the third node comprises indicating to the third node that it should send the first part to the user by sending a token to the third node.

6. The method of claim 1, wherein the indicating to the third node comprises indicating to the third node that it should send the first part to the user by using a common time reference.

7. The method of claim 1, further comprising determining independently by the second node that the third node should send the first part to the client device.

8. The method of claim 1, further comprising determining by a broker that the third node should send the first part to the client device.

9. The method of claim 1, wherein the third node is the second node.

10. The method of claim 1, further comprising reallocating the first part to the third node.

11. The method of claim 1, wherein the client device buffers at least some of the received content.

12. The method of claim 1, wherein the client device presents received parts in the order that they are received.

13. The method of claim 1, wherein the client device is not aware that the content is being delivered from more than one node.

14. The method of claim 1, wherein the nodes do not share memory.

15. The method of claim 1, wherein at least one part includes trick content for implementing trick mode playback.

16. The method of claim 1, further comprising allocating the parts among the first node, the second node, and the third node using a deterministic algorithm.

17. The method of claim 1, further comprising the step of allocating the parts among the first node, the second node, and the third node using a non-deterministic algorithm.

* * * * *